Figure 1:
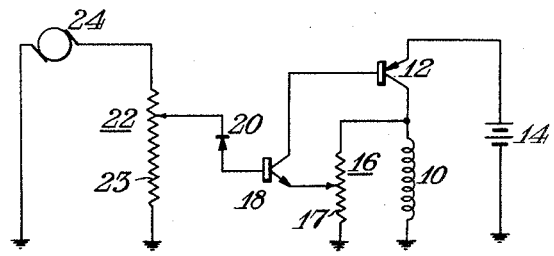

July 14, 1964  TETSUMASA ASANO  3,141,103

ELECTRIC CONTROL DEVICE FOR ELECTROMAGNETIC CLUTCH

Filed Jan. 23, 1962

' # United States Patent Office 3,141,103
Patented July 14, 1964

3,141,103
ELECTRIC CONTROL DEVICE FOR ELECTROMAGNETIC CLUTCH
Tetsumasa Asano, Himeji, Japan, assignor to Mitsubishi Denki Kabushiki Kaisha, Tokyo, Japan, a corporation of Japan
Filed Jan. 23, 1962, Ser. No. 168,046
Claims priority, application Japan Jan. 30, 1961
3 Claims. (Cl. 310—95)

This invention relates generally to an electric control device for controlling an electromagnetic clutch wherein an increase in an energizing current flowing through an electromagnetic coil for the electromagnetic clutch effects the corresponding increase in transmission torque of the clutch. More particularly the invention is concerned with an electric control circuit for an electromagnetic clutch operative to supply an electromagnetic coil for the clutch with an energizing current whose magnitude is proportional to a speed of rotation of a driving shaft during the entire period of time from the beginning of the coupling of the clutch with a drive to the end thereof.

One object of the invention is to provide an improved electric control device particularly suited for use with a clutch for a vehicle to automatically start the same.

With the object in view the invention resides in an electric control device for an electromagnetic clutch comprising a source of direct current voltage for providing a direct current output voltage having a magnitude proportional to a speed of rotation of driving shaft, a Zener diode coupled to said source of direct current voltage, and means including an electromagnetic coil for the electromagnetic clutch and operative, when the output voltage from said source of direct current voltage exceeds the Zener breakdown voltage of said Zener diode, to energize said electromagnetic coil in proportion to a difference between said output voltage and said Zener breakdown voltage.

The electromagnetic clutch is energized to be coupled to a drive or motor at a predetermined speed of rotation of the motor somewhat higher than the speed of idling rotation thereof. Thereafter, the clutch will have its degree of coupling increased in accordance with the operating characteristics of the motor.

In a preferred embodiment of the invention an electric control device comprises a first source of direct current voltage, a first transistor, an electromagnetic coil for the electromagnetic clutch connected to said first source of direct current voltage through said first transistor, a second transistor connected to control the conduction of said first transistor, a Zener diode connected in the base-to-emitter path of the second transistor, a second source of direct current voltage for providing a direct current output voltage having a magnitude proportional to a speed of rotation of a driving shaft, said second source being connected in series circuit relationship with said Zener diode, the arrangement being such that, when the output voltage from said second source exceeds the Zener breakdown voltage of said Zener diode said first transistor is put in conducting state through the conduction of said second transistor whereby said electromagnetic coil is energized by said first source.

Figure 2:
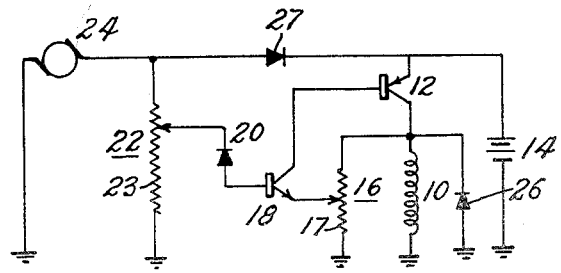

The invention will become more readily apparent from the following description taken in conjunction with the accompanying drawing in which FIG. 1 is a schematic diagram of a control circuit for an electromagnetic clutch embodying the teachings of the invention; and FIG. 2 is a schematic diagram of a second embodiment of the control circuit.

Referring now to the drawing, there is illustrated in FIG. 1 an electric control circuit embodying the teachings of the invention for controlling an electromagnetic clutch. The reference numeral 10 designates an electromagnetic coil for an electromagnetic clutch (not shown) having one end connected through a collector-to-emitter path of a first transistor 12 to one terminal or a positive terminal of a source of direct current voltage represented for example by a battery 14. The electromagnetic coil 10 has the other end connected to ground and the other end of the battery 14 is connected also to ground. Across the coil 10 is connected a resistor 16 having thereon an intermediate tap connected to an emitter of a second transistor 18. The transistor 18 includes a collector connected to the base of the first transistor 12 and a base connected through a Zener diode 20 to an intermediate tap on a second resistance 22 having one end connected to a second source of direct current voltage 24 operative to produce a direct current output voltage whose magnitude is proportional to a speed of rotation of a driving shaft (not shown) for the electromagnetic clutch, and having the other end connected to ground. The second source 24 is shown as being a pilot generator mounted on said driving shaft and as having one end connected to the ground.

As shown, one portion 23 of the resistor 22, the Zener diode 20, the base-to-emitter path of the second transistor 18 and the portion 17 of the resistor 16 are connected in series circuit relationship to each other and this series arrangement is connected in parallel circuit relationship to the one portion 23 of the second resistor 22.

Now assuming that the electromagnetic clutch device is coupled to the motor, the second source of direct current voltage 24 or the pilot generator in this case provides a direct current voltage whose magnitude is proportional to a speed of rotation of the driving shaft for the clutch. This voltage energizes the second resistor 22 whereby a direct current voltage developed across the portion 23 of the resistor 22 will reversely bias the Zener diode 20.

As the speed of rotation of the driving shaft is increased the voltage across the portion 23 of the resistor 22 is increased until the same will exceed the Zener breakdown voltage of the Zener diode 20. When this happens the Zener diode 20 is broken down permitting a current to begin to flow from the source 24 through that portion of the resistor 22 disposed between the upper end thereof (as viewed in the drawing) and the tap thereon, the now conducting Zener diode 20, the base of the transistor 18, the emitter thereof, the portion 17 of the resistor 16 to ground and thence back to the source 24. Then the transistor 12 becomes conductive by a voltage developed across the resistor 17 by the flow of current through the transistor 18, and the electromagnetic coil 10 is energized by the battery 14 through the now conducting transistor 12. Therefore, the electromagnetic clutch is initiated to be coupled with a drive or motor. Under these circumstances increase in the speed of rotation of the driving shaft effects increase in the currents flowing through the transistors 18 and 12 until the transistor 12 will be driven in saturated state. At the same time a voltage across the coil 10 is increased until it will reach the maximum magnitude when the transistor 12 is brought into its saturated state. Thus it will be appreciated that, as the speed of rotation of the driving shaft is increased the electromagnetic clutch is increased in degree of coupling until it will be fully coupled to the motor.

For purpose of explanation it is now assumed that $n$ designates a speed of rotation of the driving shaft of the electromagnetic clutch device, $E_D$ a direct current voltage applied to the resistor 22 by the source 22 and that $E_z$ represents a Zener breakdown voltage of Zener diode 20. It is also assumed that the resistor 16 has the total resistance of $R_1$ while the portion 17 thereof has a resistance $R_2$ and that the resistor 22 has the total resistance of $R_3$ while the portion 23 thereof has a resistance $R_4$.

As previously described, the output voltage from the source 24 is proportional to the speed of rotation of the driving shaft. Therefore, there is obtained the equation $$E_p = K_1 n \qquad (1)$$

where $K_1$ is a constant. From the relationship among voltages developed across components of a circuit arrangement comprising the resistor 23 and the electric path connected in parallel thereto it is possible to write the equation $$\frac{R_4}{R_3}E_p = E_z + \frac{R_2}{R_1}E_c \qquad (2)$$

where $E_c$ represents a voltage applied to the electromagnetic coil 10 by the battery 14. It is to be noted that a voltage drop occurring between the base and the emitter of the conducting transistor 18 is negligible. From the Equations 1 and 2 there is obtained the equation $$E_c = \frac{K_1 K_2}{K_3} n - \frac{E_z}{K_3} \qquad (3)$$

where $$K_2 = \frac{R_4}{R_3} \text{ and } K_3 = \frac{R_2}{R_1}$$

It should be understood that the voltage $E_c$ is equal to or larger than zero. If $E_c = 0$ then $$n = \frac{E_z}{K_1 K_2} \qquad (4)$$

The speed of rotation $n$ expressed by the above Equation 4 corresponds to that speed of rotation at which the electromagnetic clutch is started to be coupled to the motor. For the magnitudes of speed of rotation $n$ higher than the magnitude expressed by the Equation 4, it is apparent that, as the speed of rotation $n$ is increased the voltage $E_c$ is linearly increased with a proportional constant of $$\frac{K_1 K_2}{K_3}$$

which, in turn can be adjusted by selecting the magnitudes of $K_2$ and $K_3$. In other words, the increase in the speed of the driving shaft effects a linear increase in the degree of coupling of the clutch and hence in transmission torque thereof.

As previously pointed out, the voltage $E_c$ applied to the electromagnetic coil 10 reaches its maximum magnitude when the transistor 12 has been brought into its saturated state by virtue of the increase in the speed of the driving shaft. However, a further increase in the speed of the driving shaft effects no increase in the voltage $E_c$. Therefore, the voltage $E_c$ remains unchanged regardless of such further increase in speed of rotation of the driving shaft. The ampere-turns of the electromagnetic coil can be determined such that the electromagnetic clutch will have fully coupled to the motor immediately before the voltage applied to the electromagnetic coil will reach its maximum magnitude.

From the foregoing it will be apparent that, according to the invention an electromagnetic clutch is started to be coupled to a drive or motor at a predetermined speed of rotation of a driving shaft followed by linear increase in the degree of such coupling in accordance with increase in the speed of rotation of the driving shaft. Eventually the clutch will be fully coupled to the motor. With the invention applied to a clutch for an automobile motor, it is ensured that the clutch is completely disengaged from the motor during idling rotation of the latter and that a vehicle equipped with such clutch is prevented from creeping.

The present control device previously described has certain further advantages. For example, a speed of a driving shaft at which a clutch is initiated to be coupled to a motor, the coupling characteristics whereby the degree of coupling is increased and a speed of the driving shaft at which the clutch has been fully coupled to the motor can be suitably selected so that the clutch can be coupled to the motor in accordance with the operating characteristics of the motor whereby a vehicle comprising such control device can be automatically started in a satisfactory manner only by depressing an accelerator. The device according to the invention comprises no movable member resulting in the provision of a small-sized electromagnetic clutch having an extremely high reliability. Further, with a current flowing through the Zener diode 20, a voltage across the resistor 23 balances out the sum voltage of the Zener voltage of the Zener diode 20 and a voltage across the resistor 17 due to a flow of current from the source of direct current voltage 14 through the transistor 12 to the resistor 16 resulting from the arrangement of the components 23, 20, 17 previously described. Therefore, the device is advantageous in that the Zener diode used is required only to have a relatively low current capacity sufficient to be capable of supplying a base current to the transistor 18.

While the invention has been shown and described in conjunction with one preferred embodiment thereof it is to be understood that various changes in detail of construction and the combination and arrangement of the components may be resorted to without departing from the spirit and scope of the invention. For example, as illustrated in FIG. 2 in which the same reference numerals are employed as in FIG. 1 as to alike components a diode may be shunted across the electromagnetic coil 10 in order to absorb a surge voltage which might be applied to the transistor 12. In order to prevent an excess current from flowing through the Zener diode 20, the source 24 may charge the battery 14 through a rectifier 27 with the transistor 12 arranged to be in a saturated state upon effecting such charging. With this arrangement, the output voltage from the source 24 can not be higher excessively than the output voltage from the battery 12.

What I claim is:

1. An electric control circuit for an electromagnetic clutch comprising, a first source of direct current voltage, a first transistor, an energizing coil for energizing and actuating the electromagnetic clutch connected to said first source of direct current voltage through said first transistor, a second transistor connected to control the conduction of said first transistor, a Zener diode having a preselected breakdown voltage connected in a base-to-emitter current flow path configuration of the second transistor, and a second source of voltage connected in series with said Zener diode for providing an output voltage applied to said diode as an inverse voltage and for unlocking said second transistor and having a magnitude proportional to a speed of rotation of a driven shaft, whereby when the output voltage from said second source exceeds the Zener diode breakdown voltage of said Zener diode said first transistor is rendered conductive upon conduction of said second transistor and said electromagnetic coil is energized by said first source proportionately to a difference voltage between the voltage of said second source and said breakdown voltage by said Zener diode.

2. An electric control circuit for an electromagnetic clutch comprising, a first source of direct current voltage, a first transistor, an energizing coil for energizing and actuating the electromagnetic clutch connected to said first source of direct current voltage through said first transistor, a second transistor connected to control the conduction of said first transistor, a Zener diode having a preselected breakdown voltage connected in a base-to-emitter current flow path configuration of the second transistor, a second source of voltage connected in series with said Zener diode for providing an output voltage applied to said diode as an inverse voltage and for unlocking said second transistor and having a magnitude proportional to a speed of rotation of a driven shaft, and a diode connected across said electromagnetic coil to absorb voltage surges applied to said first transistor, whereby when the output voltage from said second source exceeds the Zener diode breakdown voltage of said Zener diode said first transistor is rendered conductive upon conduction of said second transistor and said electromagnetic coil is energized by said first source proportionately to a difference voltage between the voltage of said second source and said breakdown voltage of said Zener diode.

3. An electric control circuit for an electromagnetic clutch comprising, a first source of direct current voltage, a first transistor, an energizing coil for energizing and actuating the electromagnetic clutch connected to said first source of direct current voltage through said first transistor, a second transistor connected to control the conduction of said first transistor, a Zener diode having a preselected breakdown voltage connected in a base-to-emitter current flow path configuration of the second transistor, a second source of voltage connected in series with said Zener diode for providing an output voltage applied to said diode as an inverse voltage and for unlocking said second transistor and having a magnitude proportional to a speed of rotation of a driven shaft, and means connected between said first and second sources for charging said first source from said second source whereby when the output voltage from said second source exceeds the Zener diode breakdown voltage of said Zener diode said first transistor is rendered conductive upon conduction of said second transistor and said electromagnetic coil is energized by said first source proportionately to a difference voltage between the voltage of said second source and said breakdown voltage of said Zener diode.

References Cited in the file of this patent
UNITED STATES PATENTS
2,998,538   O'Mahony _____ Aug. 29, 1961